(12) United States Patent
Matsumoto

(10) Patent No.: US 9,016,091 B2
(45) Date of Patent: *Apr. 28, 2015

(54) GLASS WELDING METHOD AND GLASS LAYER FIXING METHOD

(75) Inventor: Satoshi Matsumoto, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 199 days.

This patent is subject to a terminal disclaimer.

(21) Appl. No.: 13/511,683

(22) PCT Filed: Sep. 17, 2010

(86) PCT No.: PCT/JP2010/066136
§ 371 (c)(1),
(2), (4) Date: Jun. 13, 2012

(87) PCT Pub. No.: WO2011/065103
PCT Pub. Date: Jun. 3, 2011

(65) Prior Publication Data
US 2012/0260694 A1    Oct. 18, 2012

(30) Foreign Application Priority Data
Nov. 25, 2009   (JP) ................ P2009-267584

(51) Int. Cl.
*C03B 23/20*   (2006.01)
*B23K 26/20*   (2014.01)
(Continued)

(52) U.S. Cl.
CPC ........... *B23K 26/203* (2013.01); *B23K 26/0869* (2013.01); *B23K 26/246* (2013.01); *B23K 26/324* (2013.01); *C03C 23/0025* (2013.01);
(Continued)

(58) Field of Classification Search
USPC .................. 65/43, 59.21, 59.22
See application file for complete search history.

(56) References Cited

U.S. PATENT DOCUMENTS 3,453,097 A    7/1969  Hafner
3,663,793 A    5/1972  Petro et al.
(Continued)

FOREIGN PATENT DOCUMENTS

CN    1329395    1/2002
CN    1738777    2/2006
(Continued)

OTHER PUBLICATIONS

JP 20022366050 (Human Translation), retrieved from USPTO Translation Services and attached to the U.S. Office Action dated Apr. 25, 2013 in U.S. Appl. No. 12/994,539.
(Continued)

*Primary Examiner* — Queenie Dehghan
(74) *Attorney, Agent, or Firm* — Drinker Biddle & Reath LLP

(57) ABSTRACT

A glass layer 3 is irradiated with laser light L2 for temporary firing in order to gasify a binder and melt the glass layer 3, thereby fixing the glass layer 3 to a glass member 4. Here, an irradiation region of the laser light L2 has regions A1, A2 arranged along an extending direction of a region to be fused R and is moved along the region to be fused R such that the region A1 precedes the region A2. The region A2 irradiates the glass layer 3 before the glass layer 3 molten by irradiation with the region A1 solidifies. This makes the glass layer 3 take a longer time to solidify, whereby the binder gasified by irradiation with the region A1 of the laser light L2 is more likely to escape from the glass layer 3.

7 Claims, 14 Drawing Sheets

(51) Int. Cl.
  *B23K 26/08*  (2014.01)
  *B23K 26/24*  (2014.01)
  *B23K 26/32*  (2014.01)
  *C03C 23/00*  (2006.01)
  *C03C 27/06*  (2006.01)
  *H01J 9/26*   (2006.01)
  *H01J 9/40*   (2006.01)

(52) U.S. Cl.
  CPC ............... *C03C 27/06* (2013.01); *H01J 9/261* (2013.01); *H01J 9/268* (2013.01); *H01J 9/40* (2013.01)

(56) References Cited

U.S. PATENT DOCUMENTS

| | | |
|---|---|---|
| 4,343,833 A | 8/1982 | Sawae et al. |
| 5,489,321 A | 2/1996 | Tracy et al. |
| 6,565,400 B1 | 5/2003 | Lee et al. |
| 7,371,143 B2 | 5/2008 | Becken et al. |
| 7,641,976 B2 | 1/2010 | Lamberson et al. |
| 7,820,941 B2 | 10/2010 | Brown et al. |
| 7,834,550 B2 | 11/2010 | Lee et al. |
| 7,932,670 B2 | 4/2011 | Yoo et al. |
| 8,063,561 B2 | 11/2011 | Choi et al. |
| 8,440,479 B2 | 5/2013 | Nguyen et al. |
| 8,490,434 B2 | 7/2013 | Watanabe et al. |
| 8,516,852 B2 | 8/2013 | Matsumoto et al. |
| 2004/0069017 A1 | 4/2004 | Li et al. |
| 2004/0207314 A1 | 10/2004 | Aitken et al. |
| 2005/0103755 A1 | 5/2005 | Baker et al. |
| 2006/0082298 A1 | 4/2006 | Becken et al. |
| 2007/0007894 A1 | 1/2007 | Aitken et al. |
| 2007/0053088 A1 | 3/2007 | Kranz et al. |
| 2007/0128967 A1 | 6/2007 | Becken et al. |
| 2007/0170845 A1 | 7/2007 | Choi et al. |
| 2007/0173167 A1 | 7/2007 | Choi |
| 2008/0106194 A1 | 5/2008 | Logunov et al. |
| 2008/0124558 A1 | 5/2008 | Boek et al. |
| 2008/0135175 A1 | 6/2008 | Higuchi |
| 2008/0182062 A1 | 7/2008 | Becken et al. |
| 2009/0071588 A1 | 3/2009 | Kimura et al. |
| 2009/0080055 A1 | 3/2009 | Baur et al. |
| 2009/0086325 A1 | 4/2009 | Liu et al. |
| 2009/0110882 A1 | 4/2009 | Higuchi |
| 2009/0142984 A1 | 6/2009 | Logunov et al. |
| 2009/0297861 A1 | 12/2009 | Banks et al. |
| 2009/0297862 A1 | 12/2009 | Boek et al. |
| 2009/0308105 A1 | 12/2009 | Pastel et al. |
| 2010/0006228 A1 | 1/2010 | Abe et al. |
| 2010/0095705 A1 | 4/2010 | Burkhalter et al. |
| 2010/0116119 A1 | 5/2010 | Bayne |
| 2010/0129666 A1 | 5/2010 | Logunov et al. |
| 2010/0154476 A1 | 6/2010 | Becken et al. |
| 2010/0267307 A1 | 10/2010 | Park et al. |
| 2010/0304513 A1* | 12/2010 | Nguyen et al. .................. 438/27 |
| 2011/0001424 A1 | 1/2011 | Logunov et al. |
| 2011/0061789 A1 | 3/2011 | Matsumoto |
| 2011/0067448 A1 | 3/2011 | Matsumoto et al. |
| 2011/0072855 A1 | 3/2011 | Matsumoto et al. |
| 2011/0088430 A1 | 4/2011 | Matsumoto |
| 2011/0088431 A1 | 4/2011 | Matsumoto |
| 2011/0135857 A1 | 6/2011 | Logunov et al. |
| 2011/0169108 A1 | 7/2011 | Gardner et al. |
| 2011/0223360 A1 | 9/2011 | Shibuya et al. |
| 2011/0223371 A1 | 9/2011 | Kawanami |
| 2011/0256407 A1 | 10/2011 | Boek et al. |
| 2011/0265518 A1 | 11/2011 | Matsumoto et al. |
| 2012/0111059 A1 | 5/2012 | Watanabe et al. |
| 2012/0147538 A1 | 6/2012 | Kawanami et al. |
| 2012/0151965 A1 | 6/2012 | Matsumoto et al. |
| 2012/0156406 A1 | 6/2012 | Banks et al. |
| 2012/0222450 A1 | 9/2012 | Lamberson et al. |
| 2012/0234048 A1 | 9/2012 | Matsumoto |
| 2012/0240628 A1 | 9/2012 | Matsumoto |
| 2012/0240629 A1 | 9/2012 | Matsumoto |
| 2012/0240630 A1 | 9/2012 | Matsumoto |
| 2012/0240631 A1 | 9/2012 | Matsumoto |
| 2012/0240632 A1 | 9/2012 | Matsumoto |
| 2012/0240633 A1 | 9/2012 | Matsumoto |
| 2012/0247153 A1 | 10/2012 | Matsumoto |
| 2012/0260694 A1 | 10/2012 | Matsumoto |
| 2012/0285200 A1 | 11/2012 | Tanaka |
| 2012/0287026 A1 | 11/2012 | Masuda |
| 2012/0318023 A1 | 12/2012 | Shimomura |
| 2012/0320444 A1 | 12/2012 | Baur et al. |
| 2013/0011598 A1 | 1/2013 | Kawanami et al. |
| 2013/0104980 A1 | 5/2013 | Sridharan et al. |
| 2013/0111953 A1 | 5/2013 | Maloney et al. |
| 2013/0134396 A1 | 5/2013 | Shimomura et al. |
| 2013/0174608 A1 | 7/2013 | Takeuchi et al. |
| 2013/0237115 A1 | 9/2013 | Choi et al. |
| 2013/0280981 A1 | 10/2013 | Lee |
| 2013/0314760 A1 | 11/2013 | Baur et al. |

FOREIGN PATENT DOCUMENTS

| | | |
|---|---|---|
| CN | 1798708 | 7/2006 |
| CN | 1798710 | 7/2006 |
| CN | 1836177 | 9/2006 |
| CN | 101005915 | 7/2007 |
| CN | 101095247 | 12/2007 |
| CN | 101103429 | 1/2008 |
| CN | 101139165 | 3/2008 |
| CN | 100409392 C | 8/2008 |
| CN | 101312234 | 11/2008 |
| CN | 101434453 | 5/2009 |
| CN | 101501808 | 8/2009 |
| CN | 102056858 | 5/2011 |
| JP | 2-120259 | 5/1990 |
| JP | 5166462 | 7/1993 |
| JP | 2002-015108 | 1/2002 |
| JP | 2002-224871 | 8/2002 |
| JP | 2002-287107 | 10/2002 |
| JP | 2002-366050 | 12/2002 |
| JP | 2002-367514 | 12/2002 |
| JP | 2004-182567 | 7/2004 |
| JP | 2005-007665 | 1/2005 |
| JP | 2005-213125 | 8/2005 |
| JP | 2006-151774 | 6/2006 |
| JP | 2006-524419 | 10/2006 |
| JP | 2007-90405 | 4/2007 |
| JP | 2007-264135 | 10/2007 |
| JP | 2008-115057 | 5/2008 |
| JP | 2008-115067 | 5/2008 |
| JP | 2008-127223 | 6/2008 |
| JP | 2008-527655 | 7/2008 |
| JP | 2009-123421 | 6/2009 |
| JP | 2009-196862 | 9/2009 |
| KR | 10-0350323 | 3/2002 |
| KR | 10-2007-00003681 | 1/2007 |
| TW | I495409 | 7/2002 |
| TW | 200516064 | 5/2005 |
| TW | I255934 | 6/2006 |
| TW | 200733787 | 9/2007 |
| TW | 200737370 | 10/2007 |
| TW | 200822789 | 5/2008 |
| TW | 200911438 | 3/2009 |
| TW | 200944908 | 11/2009 |
| WO | WO 2007/067533 | 6/2007 |
| WO | WO 2009/131144 | 10/2009 |
| WO | 2009/157281 | 12/2009 |
| WO | WO 2009/150975 | 12/2009 |
| WO | WO 2009/150976 | 12/2009 |
| WO | WO 2009-157282 | 12/2009 |

OTHER PUBLICATIONS

JP 2008115057 (Human Translation), retrieved from USPTO Translation Services and attached to the U.S. Office Action dated Apr. 25, 2013 in U.S. Appl. No. 12/994,539.

U.S. Office Action dated Apr. 25, 2013 that issued in U.S. Appl. No. 12/994,539 including Double Patenting Rejections on pp. 5-8.

(56) References Cited

OTHER PUBLICATIONS

JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Jun. 6, 2012 that issued in U.S. Appl. No. 13/345,199 including Double Patenting Rejections on pp. 5-8.
U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
U.S. Office Action dated Jan. 16, 2014 that issued in U.S. Appl. No. 13/511,735 including Double Patenting Rejections on pp. 4-8.
U.S. Office Action dated Jan. 28, 2014 that issued in U.S. Appl. No. 13/511,688 including Double Patenting Rejections on pp. 4-8.
U.S. Office Action dated Jan. 22, 2013 that issued in U.S. Appl. No. 13/345,199 including Double Patenting Rejections on pp. 6-8.
U.S. Office Action dated Jul. 31, 2014 that issued in U.S. Appl. No. 12/994,354 including Double Patenting Rejections on pp. 7-10.
U.S. Office Action dated Jul. 2, 2014 that issued in U.S. Appl. No. 13/511,754 including Double Patenting Rejections on pp. 5-8.
U.S. Office Action dated Jul. 1, 2014 that issued in U.S. Appl. No. 13/511,738 including Double Patenting Rejections on pp. 4-5.
U.S. Office Action dated Jan. 22, 2014 that issued in U.S. Appl. No. 13/509,112 including Double Patenting Rejections on pp. 4-5.
U.S. Office Action dated Jul. 1, 2014 that issued in U.S. Appl. No. 13/511,747 including Double Patenting Rejections on pp. 4-5.
U.S. Office Action dated Apr. 25, 2014 that issued in U.S. Appl. No. 13/511,721 including Double Patenting Rejections on pp. 2-3.
U.S. Office Action dated Feb. 24, 2015 that issued in U.S. Appl. No. 13/345,199 including Double Patenting Rejections on pp. 4-14.

* cited by examiner (a)

(b)

(a)

(b)

(a)

(b)

GLASS WELDING METHOD AND GLASS LAYER FIXING METHOD

TECHNICAL FIELD

The present invention relates to a glass fusing method which manufactures a glass fusing structure by fusing glass members together and a glass layer fixing method therefor.

BACKGROUND ART

Known as a conventional glass fusing method in the above-mentioned technical field is a method which burns a glass layer containing organic matters (organic solvents and binders), a laser-light-absorbing material, and a glass powder onto one glass member along a region to be fused, then superposes the other glass member on the one glass member with the glass layer interposed therebetween, and irradiates the glass layer with laser light along the region to be fused, so as to fuse the glass members to each other.

Meanwhile, for fixing the glass layer to a glass member, techniques for removing the organic matters from the glass layer by irradiation with laser light instead of heating in a furnace have been proposed (see, for example, Patent Literatures 1 and 2). Such techniques can prevent functional layers and the like formed on glass members from being worsened by heating and inhibit the energy consumption from being increased by the use of the furnace and the heating time from becoming longer in the furnace.

CITATION LIST

Patent Literature

Patent Literature 1: Japanese Patent Application Laid-Open No. 2002-366050
Patent Literature 2: Japanese Patent Application Laid-Open No. 2002-367514

SUMMARY OF INVENTION

Technical Problem

However, there has been a case where fixing a glass layer to a glass member by irradiation with laser light (so-called temporary firing) and then fusing glass members to each other with the glass layer interposed therebetween by irradiation with laser light (so-called final firing) causes a leak in the glass layer, thus failing to yield a glass fusing structure which requires hermetic fusing.

In view of such circumstances, it is an object of the present invention to provide a glass fusing method which can manufacture a glass fusing structure which requires hermetic fusing, and a glass layer fixing method therefor.

Solution to Problem

For achieving the above-mentioned object, the inventor conducted diligent studies and, as a result, has found out that the leak in the glass layer in the glass fusing structure is caused by the removal of the binder from the glass layer. That is, when the glass layer is irradiated with laser light while relatively moving the laser light irradiation region along the region to be fused in order to gasify the binder and melt the glass powder, thereby fixing the glass layer to the glass member, there is a case where the glass layer solidifies before decomposition gases of the binder totally escape from the molten glass layer, since the melting point of the glass powder is higher than the decomposition point of the binder. This forms a number of bubbles in the glass layer as illustrated in FIG. 13, which, when joined together, cause a leak in the glass layer in the glass fusing structure.

If the glass layer is irradiated with the laser light again in order to eliminate the bubbles formed therein, they cannot easily be buried. This seems to be because of the fact that the viscosity of the glass layer is enhanced. When fixing the glass layer to the glass member by irradiation with laser light at such a laser power as to be able to gasify the binder alone without melting the glass powder and then at such a laser power as to be able to melt the glass powder, the glass layer flocculates as illustrated in FIG. 14 without wetting the glass member. This seems to be because of the fact that the gasified binder penetrates between the glass member and glass layer at the time of initial laser light irradiation.

Based on the foregoing findings, the inventor has conducted further studies and completed the present invention. That is, the glass fusing method in accordance with the present invention is a glass fusing method for manufacturing a glass fusing structure by fusing first and second glass members to each other, the method comprising the steps of arranging a glass layer containing a binder, a laser-light-absorbing material, and a glass powder with a predetermined width on the first glass member along an extending region to be fused; irradiating the glass layer with first laser light while relatively moving an irradiation region of the first laser light along the region to be fused, so as to gasify the binder and melt the glass powder, thereby fixing the glass layer to the first glass member; and superposing the second glass member on the first glass member having the glass layer fixed thereto with the glass layer interposed therebetween and irradiating the glass layer with second laser light, so as to fuse the first and second glass members to each other; wherein the irradiation region of the first laser light has first and second regions arranged along the extending direction of the region to be fused and is moved along the region to be fused such that the first region precedes the second region; and wherein the second region irradiates the glass layer before the glass layer molten by irradiation with the first region solidifies. The glass layer fixing method in accordance with the present invention is a glass layer fixing method for manufacturing a glass-layer-fixed member by fixing a glass layer to a first glass member, the method comprising the steps of arranging the glass layer containing a binder, a laser-light-absorbing material, and a glass powder with a predetermined width on the first glass member along an extending region to be fused; and irradiating the glass layer with first laser light while relatively moving an irradiation region of the first laser light along the region to be fused, so as to gasify the binder and melt the glass powder, thereby fixing the glass layer to the first glass member; wherein the irradiation region of the first laser light has first and second regions arranged along the extending direction of the region to be fused and is moved along the region to be fused such that the first region precedes the second region; and wherein the second region irradiates the glass layer before the glass layer molten by irradiation with the first region solidifies.

In the glass fusing method and glass layer fixing method, the glass layer is irradiated with the first laser light in order to gasify the binder and melt the glass powder, so that the glass layer is fixed to the first glass member. Here, the irradiation region of the first laser light has first and second regions arranged along the extending direction of the region to be fused and is moved along the region to be fused such that the first region precedes the second region. The second region irradiates the glass layer before the glass layer molten by irradiation with the first region solidifies. Since the second region of the first laser light thus irradiates the glass layer before the glass layer solidifies, it takes a longer time for the glass layer to solidify, whereby the binder gasified by irradiation with the first region of the first laser light is more likely to escape from the glass layer. Therefore, the glass fusing method and glass layer fixing method can inhibit bubbles from being formed in the glass layer, thereby making it possible to manufacture a glass fusing structure which requires hermetic fusing.

Preferably, in the glass fusing method and glass layer fixing method, the first laser light has an intensity higher in the first region than in the second region. This can efficiently melt the glass layer in a short time. On the other hand, when the second region irradiates the glass layer following the first region, the temperature of the glass layer is prevented from continuously rising to reach its crystallization temperature and thus can be kept at a temperature higher than its melting point but lower than the crystallization temperature.

In the glass fusing method in accordance with the present invention, the first and second regions may be joined to each other or separated from each other. In either case, the second region of the first laser light irradiates the glass layer before the glass layer solidifies, whereby the binder gasified by irradiation with the first region of the first laser light is more likely to escape from the glass layer. From the viewpoint of reducing the stress caused by cooling between the irradiations with the first and second regions, it is preferred for the first and second regions to be joined to each other.

Preferably, in the glass fusing method in accordance with the present invention, the first laser light irradiates the glass layer through the first glass member from the first glass member side. In this case, a part of the glass layer on the first glass member side is fully heated, so that the adhesion of the glass layer to the first glass member can be improved. This also prevents the part of the glass layer on the side opposite from the first glass member (i.e., the part of the glass layer fused to the second glass member) from being crystallized by excess heat input, whereby the fusing state of the glass layer with respect to the second glass member can be made uniform.

Advantageous Effects of Invention

The present invention can manufacture a glass fusing structure which requires hermetic fusing.

DESCRIPTION OF EMBODIMENTS

Figure 1:
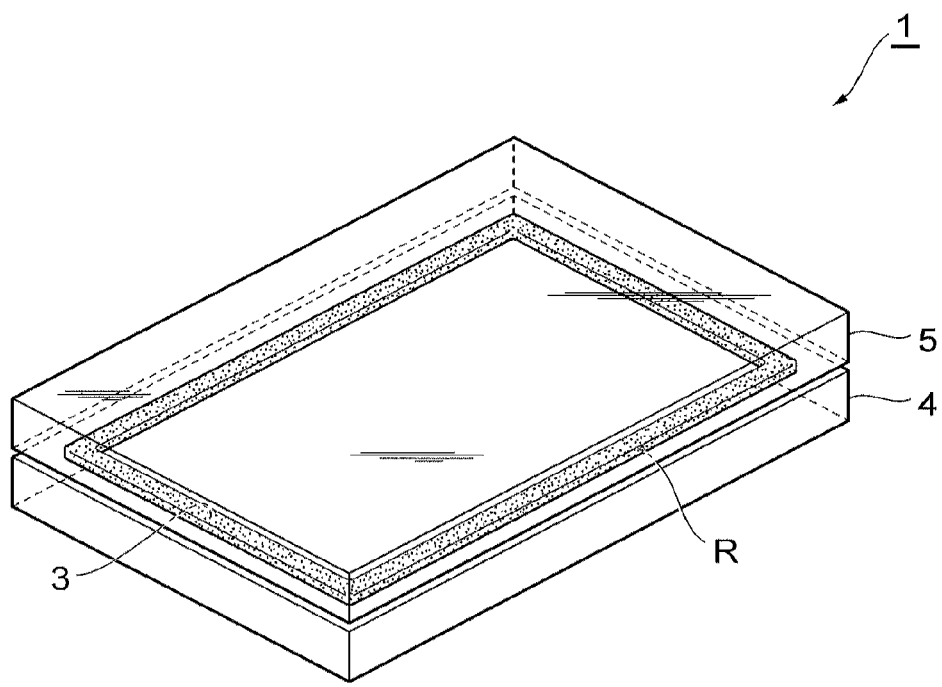
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

As illustrated in FIG. 1, a glass fusing structure 1 is one in which a glass member (first glass member) 4 and a glass member (second glass member) 5 are fused to each other with a glass layer 3, which is formed along a region to be fused R, interposed therebetween. Each of the glass members 4, 5 is a rectangular sheet-shaped member having a thickness of 0.7 mm made of non-alkali glass, for example, while the region to be fused R is arranged like a rectangular ring with a predetermined width along the outer peripheries of the glass members 4, 5. The glass layer 3 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 3 to the glass member 4 in order to manufacture the glass fusing structure 1 by fusing the glass members 4, 5 to each other) for manufacturing the glass fusing structure 1 will now be explained.

Figure 2:
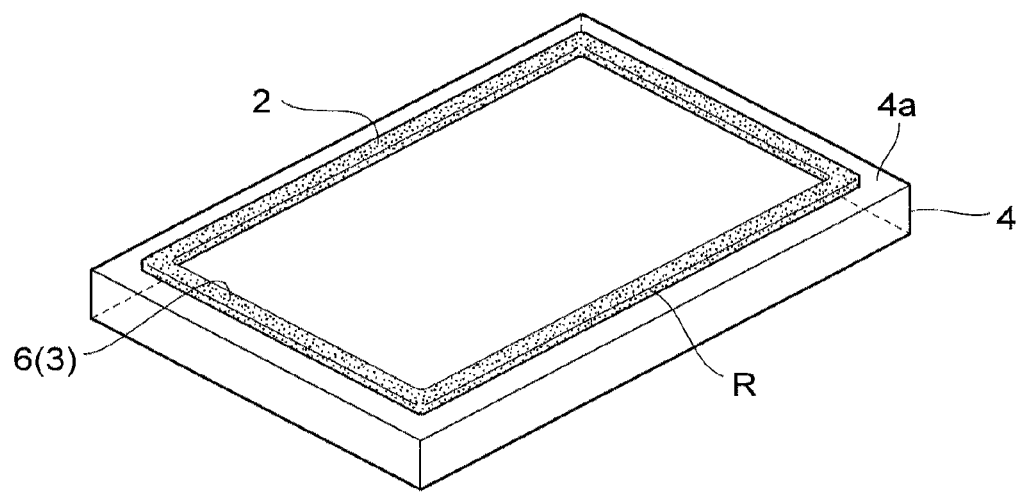
FIG. 2 is a perspective view for explaining the glass fusing method for manufacturing the glass fusing structure of FIG. 1.

First, as illustrated in FIG. 2, a frit paste is applied by a dispenser, screen printing, or the like, so as to form a paste layer 6 on a surface 4a of the glass member 4 along the region to be fused R. An example of the frit paste is one in which a powdery glass frit (glass powder) 2 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (acrylic or the like) thermally decomposable at the melting point temperature of the glass or lower are kneaded. That is, the paste layer 6 contains the organic solvent, binder, laser-light-absorbing pigment, and glass frit 2.

Subsequently, the paste layer 6 is dried, so as to remove the organic solvent. This arranges the glass layer 3 with a predetermined width on the glass member 4 along the ring-shaped region to be fused R extending like a rectangular ring. That is, the glass layer 3 contains the binder, laser-light-absorbing pigment, and glass frit 2. Scattering of light exceeding the absorption characteristic of the laser-light-absorbing pigment occurs because of the particle property of the glass fit 2 and the like in the glass layer 3 arranged on the surface 4a of the glass member 4, thereby placing it into a lower laser light absorptance state (e.g., the glass layer 3 looks whiter under visible light).

Figure 3:
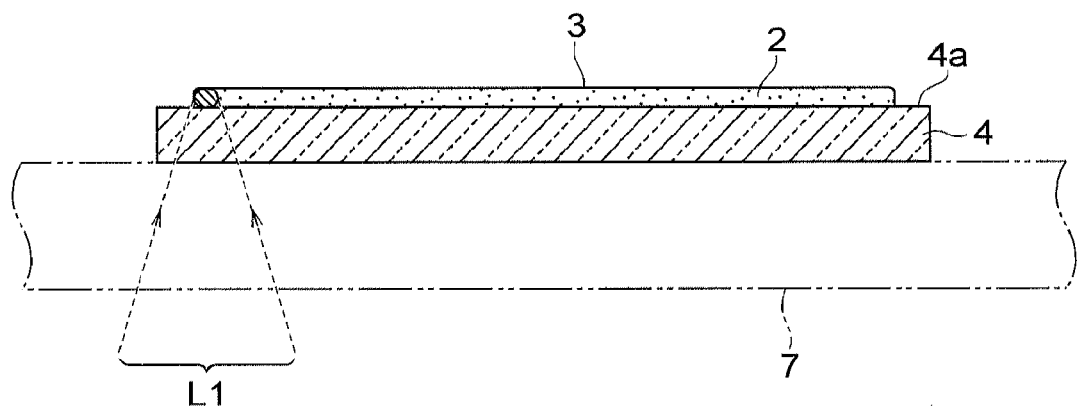
FIG. 3 is a sectional view for explaining the glass fusing method for manufacturing the glass fusing structure of FIG. 1.

Next, as illustrated in FIG. 3, the glass member 4 is mounted on a mount table 7 while the glass layer 3 is located on the upper side of the glass member 4 in the vertical direction. Then, the glass layer 3 formed into a rectangular ring along the region to be fused R is irradiated with laser light L1 while locating a converging spot at one corner thereof. The spot diameter of the laser light L1 is set greater than the width of the glass layer 3, while the laser power of the laser light L1 irradiating the glass layer 3 is adjusted so as to be kept at about the same level in the width direction (substantially orthogonal to the advancing direction of the laser light L1). This melts a part of the glass layer 3 equally in the whole width thereof, thereby forming a laser-light-absorbing part 8a having a higher laser absorptance in the whole width of this part.

Figure 4:
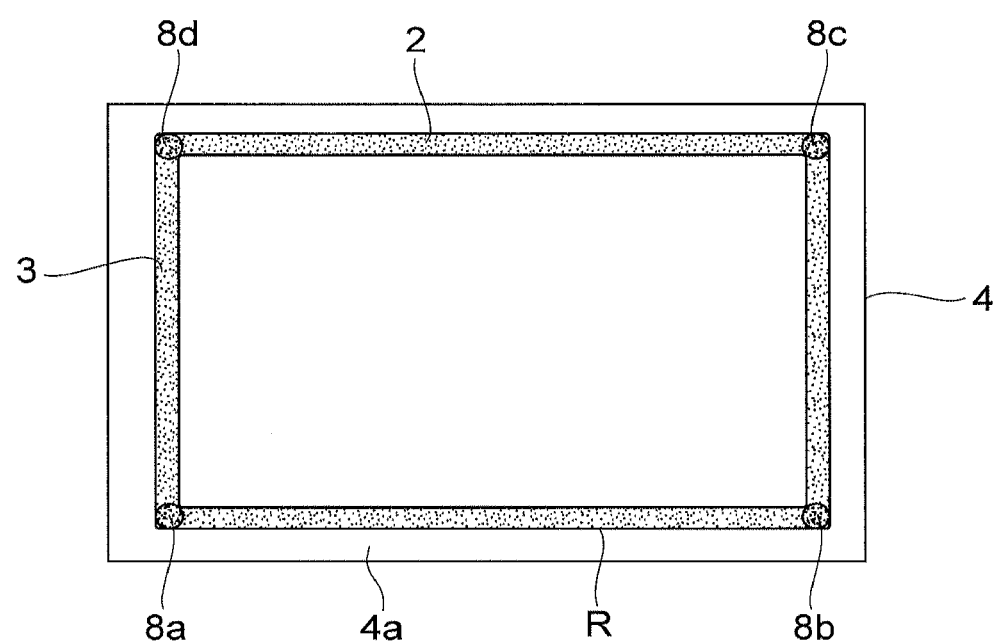
FIG. 4 is a plan view for explaining the glass fusing method for manufacturing the glass fusing structure of FIG. 1.

Thereafter, as illustrated in FIG. 4, the remaining three corners of the glass layer 3 are similarly irradiated with the laser light L1 in sequence, so as to form laser-light-absorbing parts 8b, 8c, 8d. Since the glass frit 2 melts and thus loses its particle property and so forth, the absorption characteristic of the laser-light-absorbing pigment appears remarkably in the laser-light-absorbing parts 8a to 8d, so that the laser light absorptance is higher in these parts than in the region not irradiated with the laser light L1 (e.g., only the corners corresponding to the laser-light-absorbing parts 8a to 8d look darker or greener under visible light).

Figure 5:
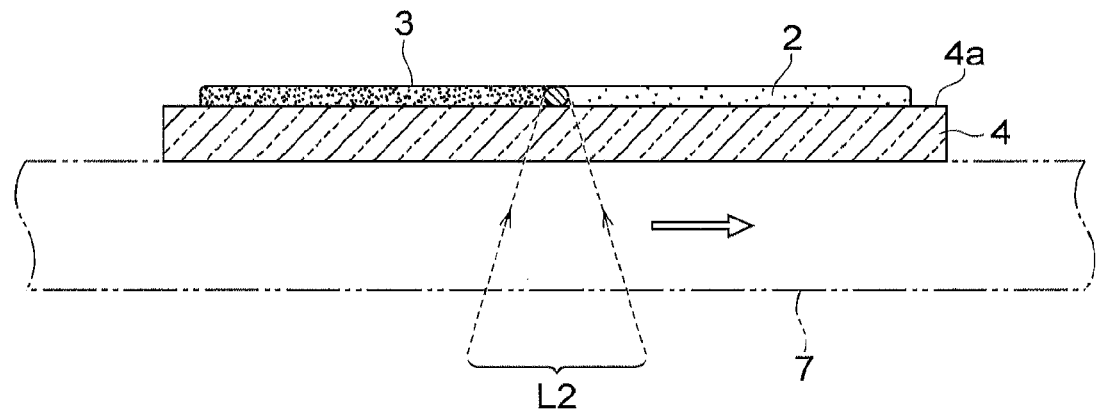
FIG. 5 is a sectional view for explaining the glass fusing method for manufacturing the glass fusing structure of FIG. 1.
Figure 6:
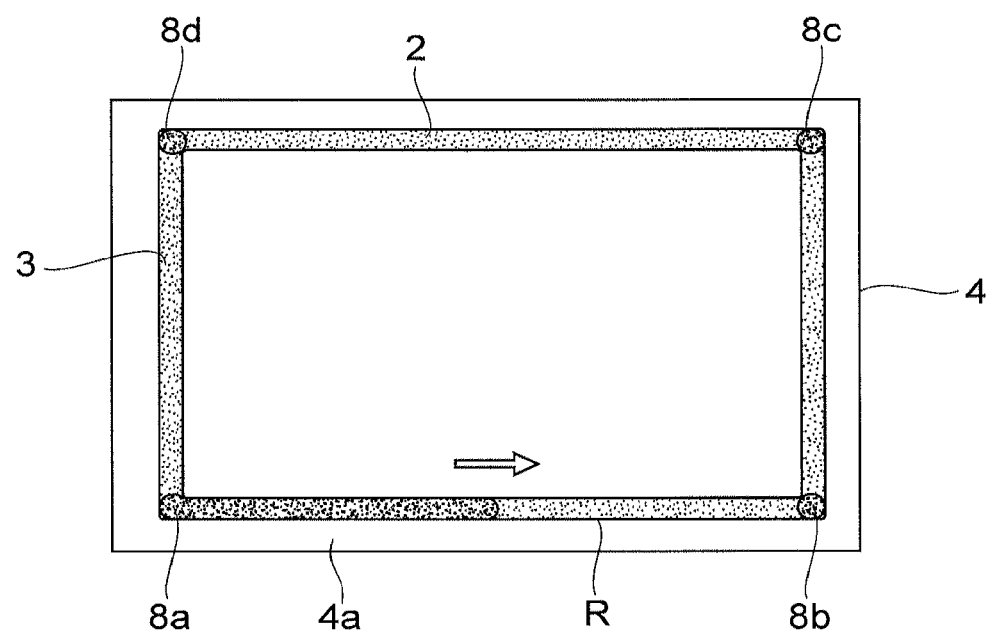
FIG. 6 is a plan view for explaining the glass fusing method for manufacturing the glass fusing structure of FIG. 1.

Subsequently, as illustrated in FIGS. 5 and 6, using the laser-light-absorbing part 8a as a start point (irradiation start position), the glass layer 3 is irradiated with laser light (first laser light) L2 along the region to be fused R while locating a converging spot at the glass layer 3. That is, the glass layer 3 is irradiated with the laser light L2 while relatively moving the irradiation region of the laser light L2 along the region to be fused R from the laser-light-absorbing part 8a acting as the irradiation start position. At this time, while the glass layer 3 is located on the upper side of the glass member 4 in the vertical direction, the glass layer 3 is irradiated with the laser light L2 through an opening (not depicted) provided in the mount table 7 and the glass member 4 from the glass member 4 side (as with the laser light L1). This gasifies the binder, so as to remove it from the glass layer 3, and melts and re-solidifies the glass layer 3, thereby burning and fixing the glass layer 3 onto the surface 4a of the glass member 4 (temporary firing), thus producing a glass-layer-fixed member.

Figure 7:
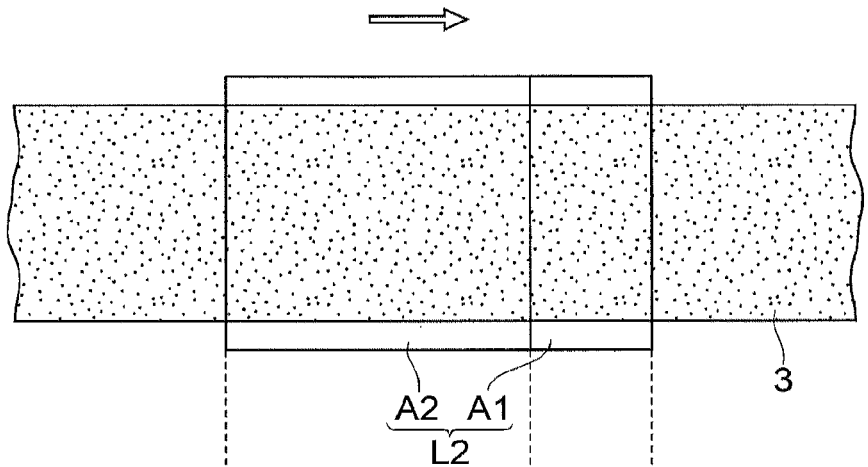
FIG. 7 is a diagram illustrating the relationship between an irradiation region of laser light for temporary firing and a glass layer.
Figure 7:
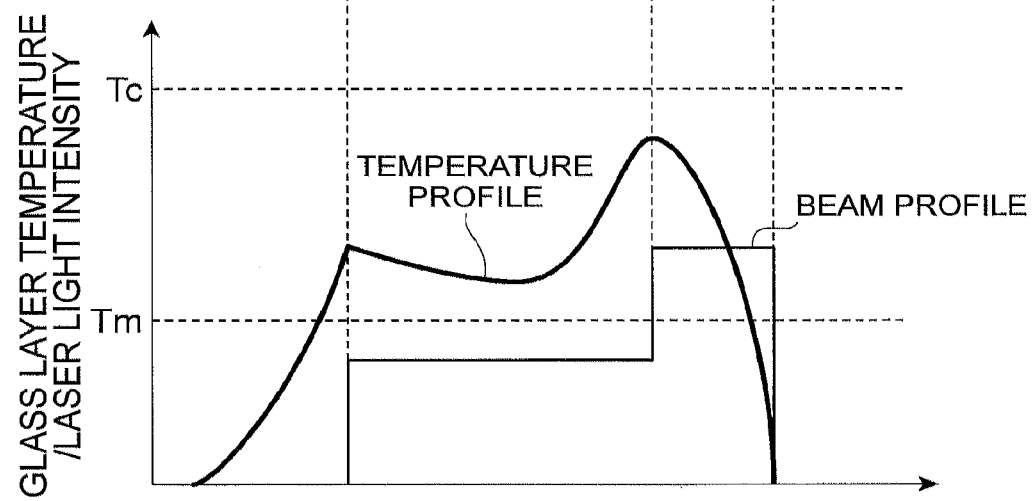

As illustrated in FIG. 7(a), the irradiation region of the laser light L2 for temporary firing has first and second regions A1, A2 which are arranged along the extending direction of the region to be fused R (i.e., in a direction substantially orthogonal to the width direction of the glass layer 3) and joined to each other. As illustrated in FIG. 7(b), the intensity of the laser light L2 is higher in the first region A1 than in the second region A2, while the irradiation region of the laser light L2 is moved along the region to be fused R such that the first region A1 precedes the second region A2. In the glass layer 3, irradiation with the first region A1 gasifies the binder and melts the glass frit 2. Then, the second region A2 irradiates the glass layer 3 before the glass layer 3 molten by irradiation with the first region A1 solidifies, whereby the gasified binder escapes from the glass layer 3. That is, the binder is gasified by irradiation with the first region A1 and let out from the glass layer 3 by irradiation with the second region A2.

At the time of temporary firing for the glass layer 3, the irradiation with the laser light L2 starts from the laser-light-absorbing part 8a having enhanced the laser light absorptance beforehand acting as the irradiation start position, so that the glass layer 3 melts in the whole width thereof immediately after the irradiation start position. This reduces an unstable region with unstable melting of the glass layer 3 and yields a stable region with stable melting of the glass layer 3 in the whole region to be fused R. Since the remaining three corners are also provided with the laser-light-absorbing parts 8b to 8d, respectively, the corners on which loads are likely to be exerted when functioning as the glass fusing structure reliably melt at the time of temporary firing. In the glass layer 3 fixed to the surface 4a of the glass member 4, the glass frit 2 melts, thereby losing its particle property and so forth in the whole region to be fused R, so that the absorption characteristic of the laser-light-absorbing pigment appears remarkably, thus yielding a higher laser light absorptance state.

Figure 8:
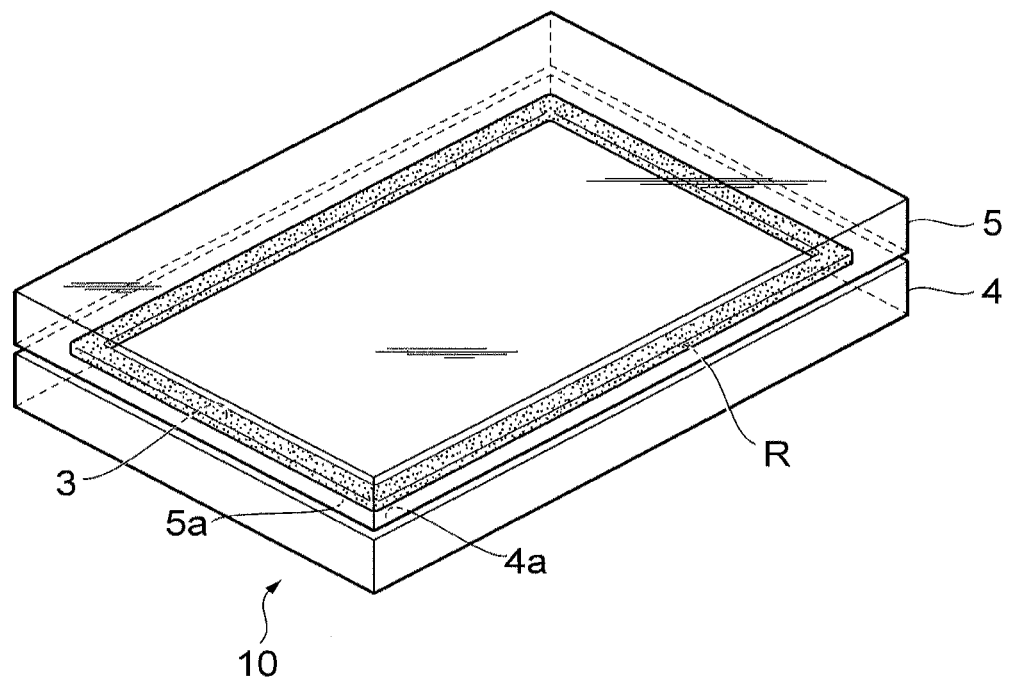
FIG. 8 is a perspective view for explaining the glass fusing method for manufacturing the glass fusing structure of FIG. 1.
Figure 9:
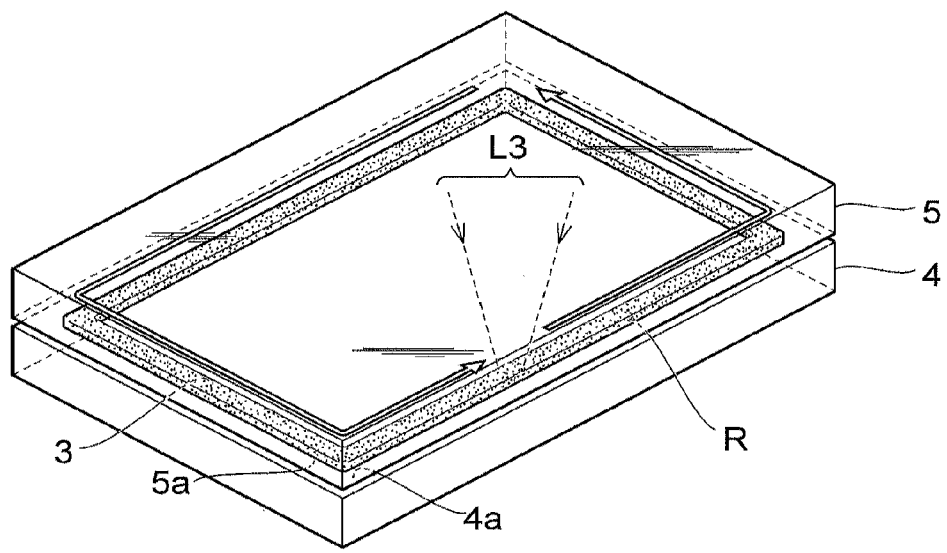
FIG. 9 is a perspective view for explaining the glass fusing method for manufacturing the glass fusing structure of FIG. 1.

Subsequently to the temporary firing for the glass layer 3, the glass member 5 is superposed on a glass-layer-fixed member 10 (i.e., the glass member 4 having the glass layer 3 fixed thereto) with the glass layer 3 interposed therebetween as illustrated in FIG. 8. Then, as illustrated in FIG. 9, the glass layer 3 is irradiated with laser light (second laser light) L3 along the region to be fused R, while locating a converging spot at the glass layer 3. That is, the glass layer 3 is irradiated with the laser light L3, while relatively moving the irradiation region of the laser light L3 along the region to be fused R. As a consequence, the laser light L3 is absorbed by the glass layer 3 having a higher laser light absorptance and uniform state throughout the region to be fused R, so that the glass layer 3 and its peripheral parts (the parts of surfaces 4a, 5a of the glass members 4, 5) melt and re-solidify (final firing), thereby bonding the glass members 4, 5 to each other along the region to be fused R, thus yielding the glass fusing structure 1 (there is also a case where not the glass members 4, 5 but the glass layer 3 melts in fusing). The whole glass layer 3 may be irradiated with the laser light L3 at once.

Figure 10:
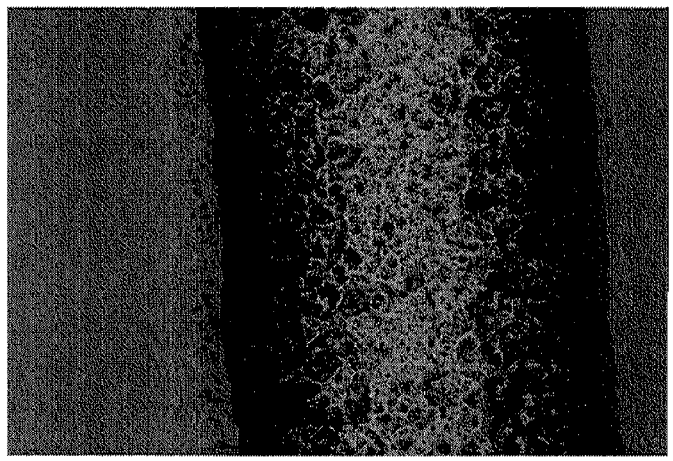
FIG. 10 is a picture representing a photograph of a glass layer formed with bubbles.

As explained in the foregoing, the glass fusing method (including the glass layer fixing method) for manufacturing the glass fusing structure 1 irradiates the glass layer 3 with the laser light L2 in order to fix the glass layer 3 to the glass member 4 by gasifying the binder and melting the glass layer 3 (i.e., for temporary firing). Here, the irradiation region of the laser light L2 has the first and second regions A1, A2 arranged along the extending direction of the region to be fused R and is moved along the extending direction of the region to be fused R such that the first region A1 precedes the second region A2. The second region A2 irradiates the glass layer 3 before the glass layer 3 molten by irradiation with the first region A1 solidifies. The second region A2 irradiates the glass layer 3 before the glass layer 3 molten by irradiation with the first region A1 solidifies. Since the second region A2 of the laser light L2 thus irradiates the glass layer 3 before the glass layer 3 molten by irradiation with the first region A1 solidifies, it takes a longer time for the glass layer 3 to solidify, whereby the binder gasified by irradiation with the first region A1 of the first laser light L2 is more likely to escape from the glass layer 3. Therefore, this glass fusing method can reliably let out the gasified binder from the molten glass layer 3, so as to inhibit bubbles from being formed in the glass layer 3 as illustrated in FIG. 10, thereby making it possible to manufacture the glass fusing structure 1 requiring hermetic fusing.

As illustrated in FIG. 7(b), the intensity of the laser light L2 is higher in the first region A1 than in the second region A2, whereby the glass layer 3 can efficiently be molten in a short time. On the other hand, when the second region A2 irradiates the glass layer 3 following the first region A1, the temperature of the glass layer 3 is prevented from continuously rising to reach its crystallization temperature Tc and thus can be kept at a temperature higher than its melting point Tm but lower than the crystallization temperature Tc.

The laser light L2 for temporary firing irradiates the glass layer 3 through the glass member 4 from the glass member 4 side. Therefore, a part of the glass layer 3 on the glass member 4 side is fully heated, so that the adhesion of the glass layer 3 to the glass member 4 can be improved. This also prevents the part of the glass layer 3 opposite from the glass member 4 (i.e., the part of the glass layer 3 fused to the glass member 5) from being crystallized by excess heat input, whereby the fusing state of the glass layer 3 with respect to the glass member 5 can be made uniform.

The laser light L2 for temporary firing irradiates the glass layer 3 in the state where the glass layer 3 is located on the upper side of the glass member 4 in the vertical direction. As a consequence, gases (e.g., decomposition gases of the binder and water vapor) generated during temporary firing can efficiently be let out to the upper side.

Figure 11:
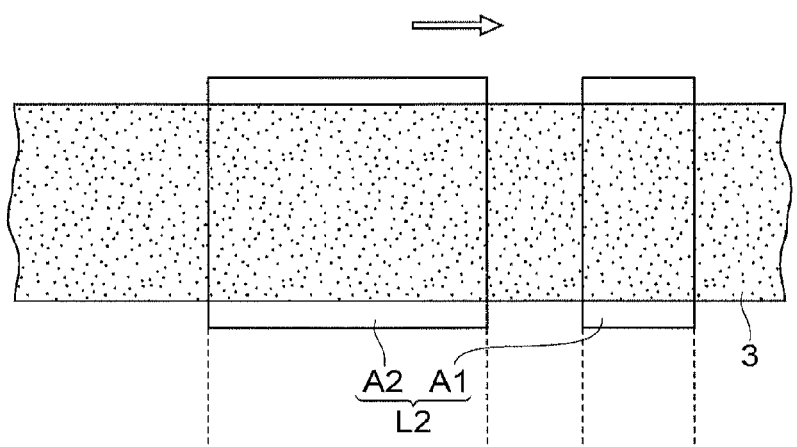
FIG. 11 is a diagram illustrating the relationship between an irradiation region of laser light for temporary firing and a glass layer.
Figure 11:
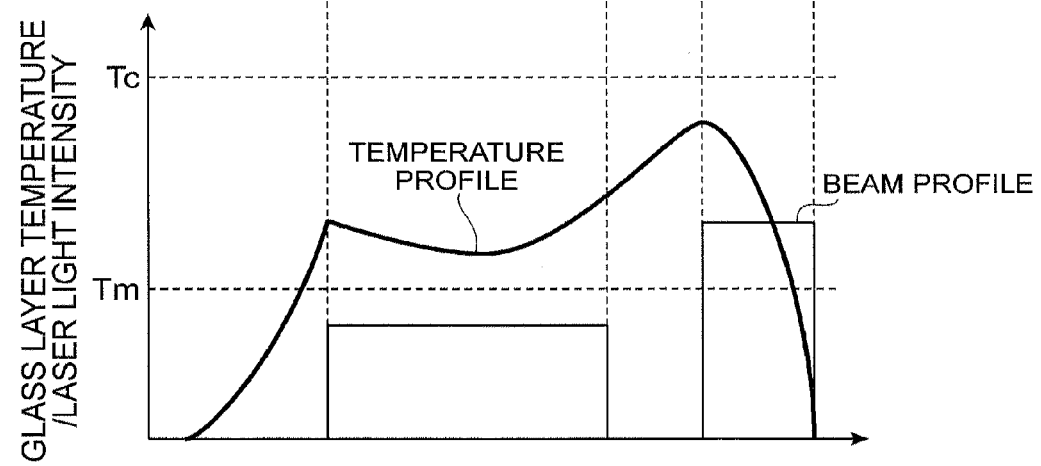

The present invention is not limited to the above-mentioned embodiment. For example, in the laser light L2 for temporary firing, the first and second regions A1, A2 may be separated from each other by a predetermined distance as illustrated in FIG. 11. Even in such a case, the second region A2 of the laser light L2 irradiates the glass layer 3 before the glass layer 3 solidifies, whereby bubbles can be inhibited from being formed in the glass layer 3. Further, since the intensity of the laser light L2 is higher in the first region A1 than in the second region A2, the glass layer 3 can efficiently be molten in a short time, while the temperature of the glass layer 3 can be kept at a temperature higher than its melting point Tm but lower than the crystallization temperature Tc.

In the case where the distance between the first and second regions A1, A2 is 5 mm, while the relative moving speed of the laser light L2 along the region to be fused R is 30 mm/sec, the intensity ratio between the first and second regions A1, A2 is 5:1, for example.

Figure 12:
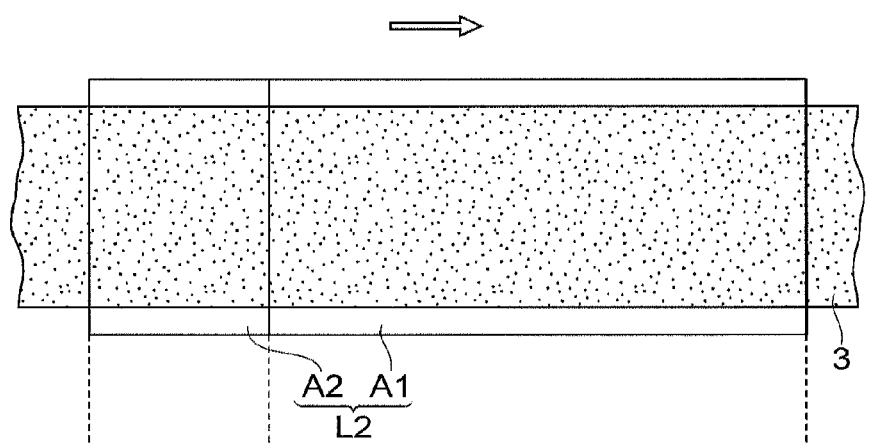
FIG. 12 is a diagram illustrating the relationship between an irradiation region of laser light for temporary firing and a glass layer.
Figure 12:
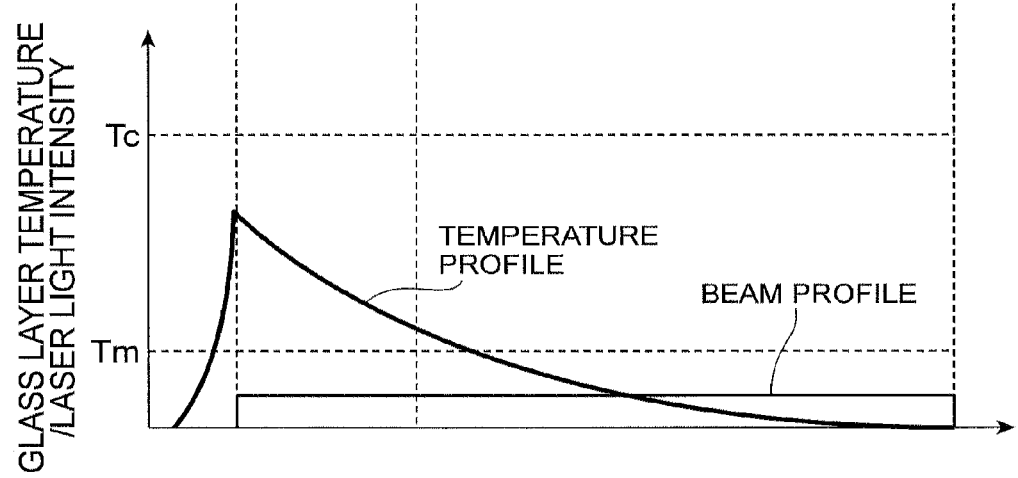
Figure 13:
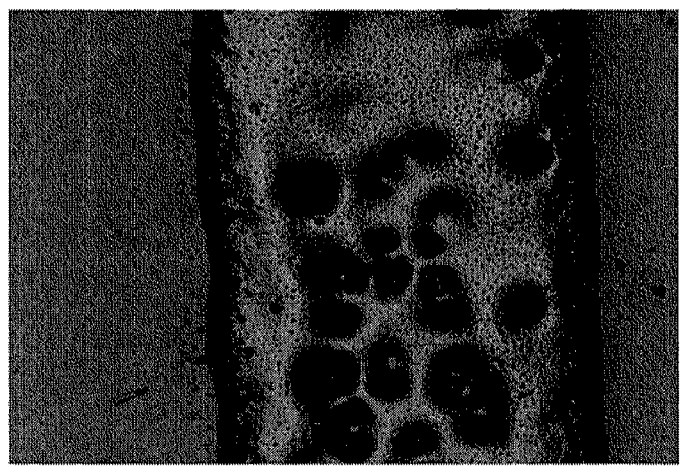
FIG. 13 is a picture representing a photograph of a glass layer formed with bubbles.
Figure 14:
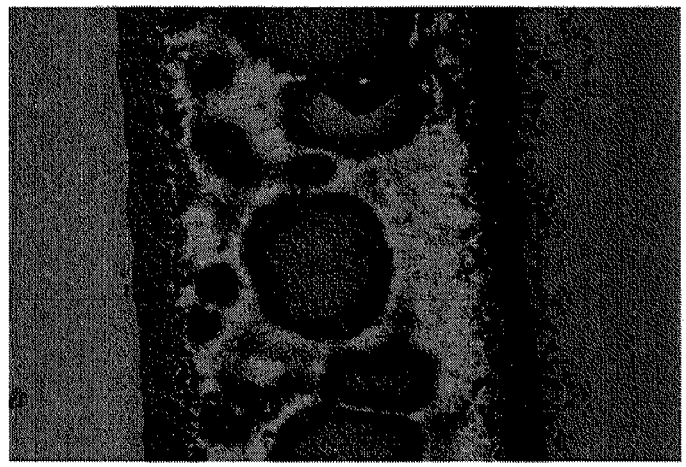
FIG. 14 is a picture representing a photograph of a flocculated glass layer.

As illustrated in FIG. 12, the laser light L2 for temporary firing may have the same intensity in the first and second regions A1, A2. In such a case, the temperature of the glass layer 3 keeps rising gradually, which makes it necessary to control the intensity in the first and second regions A1, A2 so that the temperature of the glass layer 3 does not reach the crystallization temperature Tc.

Even in such a case, however, a sufficient processing speed can be obtained, while inhibiting bubbles from being formed in the glass layer 3. When laser light having a circular irradiation region (having a diameter of 1.6 mm) is used for inhibiting bubbles from being formed in the glass layer 3, for example, it is necessary for the laser light L2 to lower its relative moving speed along the region to be fused R to 1 mm/sec. When the laser light L2 having an irradiation region (an irradiation region having first and second regions A1, A2 with the same intensity) in an elongated form (1.0 mm×3.2 mm) along the region to be fused R is used for inhibiting bubbles from being formed in the glass layer 3, by contrast, the relative moving speed of the laser light L2 along the region to be fused R can be increased to 10 mm/sec. Thus, the processing speed of the latter can be 10 times that of the former. On the other hand, it is not necessary for the latter to have a laser power which is 10 times that of the former, e.g., the former and latter may have laser powers of about 5 W and about 20 W, respectively.

The glass layer 3 to be irradiated with the laser light L2 for temporary firing is not limited to one containing the binder, laser-light-absorbing pigment, and glass fit 2, but may be one corresponding to the paste layer 6 containing the organic solvent, binder, laser-light-absorbing pigment, and glass fit 2. The glass fit 2 is not limited to one having a melting point lower than that of the glass members 4, 5, but may have a melting point not lower than that of the glass members 4, 5. The laser-light-absorbing pigment may be contained in the glass fit 2 itself.

INDUSTRIAL APPLICABILITY

The present invention can manufacture a glass fusing structure which requires hermetic fusing.

REFERENCE SIGNS LIST

1 . . . glass fusing structure; 2 . . . glass fit (glass powder); 3 . . . glass layer; 4 . . . glass member (first glass member); 5 . . . glass member (second glass member); 10 . . . glass-layer-fixed member; A1 . . . first region; A2 . . . second region; R . . . region to be fused; L2 . . . laser light (first laser light); L3 . . . laser light (second laser light)

The invention claimed is:

1. A glass fusing method for manufacturing a glass fusing structure by fusing first and second glass members to each other, the method comprising the steps of:
   arranging a glass layer containing a binder, a laser-light-absorbing material, and a glass powder with a predetermined width on the first glass member along an extending region to be fused;
   irradiating the glass layer with first laser light while relatively moving an irradiation region of the first laser light along the region to be fused, so as to gasify the binder and melt the glass powder, thereby fixing the glass layer to the first glass member; and
   superposing the second glass member on the first glass member having the glass layer fixed thereto with the glass layer interposed therebetween and irradiating the glass layer with second laser light, so as to fuse the first and second glass members to each other;
   wherein the irradiation region of the first laser light has first and second regions arranged along the extending direction of the region to be fused and is moved along the region to be fused such that the first region precedes the second region; and
   wherein the second region irradiates the glass layer before the glass layer molten by irradiation with the first region solidifies,
   the irradiation region of the first laser light, when an area of the glass layer is irradiated, is relatively moved along the region to be fused such that a time from the area reaching a temperature equal to or greater than melting point until end of the irradiation of the area with the first laser light is longer than a time from start of the irradiation of the area with the first laser light until the area reaching a temperature equal to or greater than melting point.

2. A glass fusing method according to claim 1, wherein the first laser light has an intensity higher in the first region than in the second region.

3. A glass fusing method according to claim 1, wherein the first and second regions are joined to each other.

4. A glass fusing method according to claim 1, wherein the first and second regions are separated from each other.

5. A glass fusing method according to claim 1, wherein the first laser light irradiates the glass layer through the first glass member from the first glass member side.

6. A glass layer fixing method for manufacturing a glass-layer-fixed member by fixing a glass layer to a first glass member, the method comprising the steps of:

arranging the glass layer containing a binder, a laser-light-absorbing material, and a glass powder with a predetermined width on the first glass member along an extending region to be fused; and irradiating the glass layer with first laser light while relatively moving an irradiation region of the first laser light along the region to be fused, so as to gasify the binder and melt the glass powder, thereby fixing the glass layer to the first glass member;

wherein the irradiation region of the first laser light has first and second regions arranged along the extending direction of the region to be fused and is moved along the region to be fused such that the first region precedes the second region; and wherein the second region irradiates the glass layer before the glass layer molten by irradiation with the first region solidifies, the irradiation region of the first laser light, when an area of the glass layer is irradiated, is relatively moved along the region to be fused such that a time from the area reaching a temperature equal to or greater than melting point until end of the irradiation of the area with the first laser light is longer than a time from start of the irradiation of the area with the first laser light until the area reaching a temperature equal to or greater than melting point.

7. A glass layer fixing method for manufacturing a glass-layer-fixed member by fixing a glass layer to a first glass member, the method comprising the steps of:

arranging the glass layer containing a laser-light-absorbing material and a glass powder with a predetermined width on the first glass member along an extending region to be fused; and irradiating the glass layer with first laser light while relatively moving an irradiation region of the first laser light along the region to be fused, so as to melt the glass powder, thereby fixing the glass layer to the first glass member;

wherein the irradiation region of the first laser light has first and second regions arranged along the extending direction of the region to be fused and is moved along the region to be fused such that the first region precedes the second region; and wherein the second region irradiates the glass layer before the glass layer molten by irradiation with the first region solidifies, the irradiation region of the first laser light, when an area of the glass layer is irradiated, is relatively moved along the region to be fused such that a time from the area reaching a temperature equal to or greater than melting point until end of the irradiation of the area with the first laser light is longer than a time from start of the irradiation of the area with the first laser light until the area reaching a temperature equal to or greater than melting point.

* * * * *